Patented Oct. 22, 1929

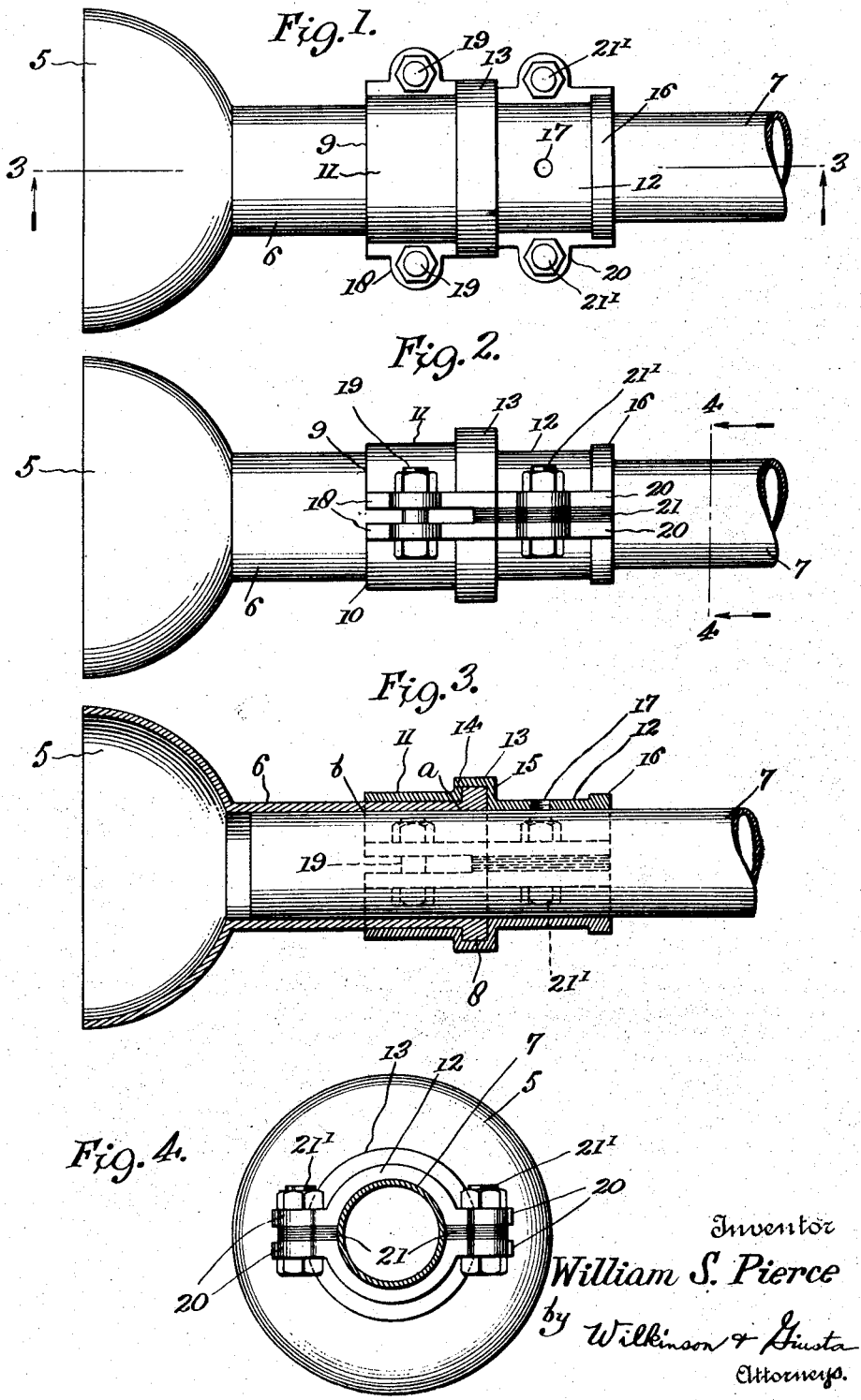

1,733,072

UNITED STATES PATENT OFFICE

WILLIAM S. PIERCE, OF KEYSTONE HEIGHTS, FLORIDA, ASSIGNOR TO KEYSTONE SPECIALTY COMPANY, OF KEYSTONE HEIGHTS, FLORIDA, A CORPORATION OF FLORIDA

UNIVERSAL-JOINT ATTACHMENT

Application filed September 24, 1927. Serial No. 221,789.

The present invention relates to improvements in universal joint attachments and has for an object to provide an improved joint between the universal joint housing and the shaft housing for reducing annoying noises and avoiding loss of lubricant and consequent damage to the parts.

Another object of the invention is to provide an improved joint at the point referred to in which adjustment to compensate for wear is provided, and in which the joint is simply constructed, is designed for adjustment to existing standard parts without requiring alteration, and prevented from axial displacement.

Further objects of the invention are to lessen the time required for repairing; to furnish an adjustable bearing; to furnish a bearing made of antifrictional metal; and to greatly cheapen the cost of repairs.

With the foregoing and other objects in view, the invention will be more fully described hereinafter, and will be more particularly pointed out in the claim appended hereto.

In the drawings, wherein like symbols refer to like or corresponding parts throughout the several views, Figure 1 is a top plan view, with portions broken away showing an improved joint constructed according to the present invention and shown as applied to the universal joint housing and shaft housing.

Figure 2 is a side elevation of the same.

Figure 3 is a longitudinal section taken on the line 3—3 in Figure 1, and

Figure 4 is a cross section taken on the line 4—4 in Figure 2.

Referring more particularly to the drawings, 5 designates a section of the usual universal joint housing having the hollow extension neck 6 to receive the shaft housing 7. The neck 6 is provided at its rear end with the external flange 8. The neck 6 is bored to receive the shaft covering or housing 7. Both parts are usually of steel and, due to the continual lateral movement of the parts incident to the travel of the automobile, friction is developed causing wear in these parts and resulting noises and rattling.

Moreover, the lubricant in and about the universal joint escapes between the worn parts 6 and 7 and the lubricant is lost and wasted and the universal joint oftentimes is damaged through lack of lubrication.

Both the parts wear so that the difficulty is not solved by providing one new part and fitting it to the old worn part. The usual procedure at the present time is to cut off neck 6 at the point indicated at $a$. Then an additional piece of a length from $a$ to $b$, generally obtained by cutting this requisite length from another like universal joint housing, is welded on at the part $a$ forming an extension and giving an increase in the length of the bearing. A new bearing is thus created enveloping a new portion of the shaft housing 7. This repair work involves considerable time and expense and when the parts again become worn, the entire housing must be replaced.

In accordance with the invention, a joint is provided between the neck 6 and the shaft housing 7. This may be a portion of the original equipment of the vehicle or it may be added only as wear and rattling occur in the parts.

This joint is made by a split collar composed preferably of two semi-cylindrical sections 9 and 10. These sections include end portions 11 and 12. The end portion 11 is of greater diameter than the end portion 12 and fits about the neck 6 adjacent the flange 8. The opposite end portion 12, of smaller diameter, is disposed about the shaft housing 7 adjacent the flange 8. The end portion 12 is in effect a continuation of the neck 6 and affords with the neck 6 an extended bearing for the housing 7. Between the end portions 11 and 12 of the split collar is an intermediate portion 13 of greater diameter than either end portion and positioned to fit about the flange 8. Transverse walls or shoulders 14 and 15 extend from opposite ends of the intermediate portion 13 to the adjacent end portions 11 and 12. These walls take against the opposite sides of the flange 8 to avoid axial movement of the split collar. The end portion 12 is preferably provided on its rear free edge with the external flange 16 and this portion 12 is also preferably provided with a threaded opening 17 to receive a grease cup or the like. The collar end portion 11 is provided with the diametrically disposed lugs 18 at the split edges of the collar to receive the bolts 19 by which the device is clamped upon the neck 6. In like manner, the opposite end portion 12 is formed with the flanges 20 to receive the bolts 21' for clamping the sections of the collar at this portion tightly on the shaft housing 7. At 21 are shown a number of shims interposed between the flanges 20 and preferably extending into the split portion of the intermediate part 13. As wear occurs the shims may be stripped or removed and the parts drawn together more tightly by the bolts 21' to compensate for this wear, thereby avoiding rattling and leakage of grease. It probably will be more desirable to use bronze for the bearing parts, although other material may be employed. In applying the device, the correct amount of shims 21 is inserted, and the bolts 19 and 21' are tightened to cause the semi-cylindrical sections to grip the parts until a tight fit is secured on the neck 6. A working fit is secured by the end portion 12 of the collar upon the shaft covering 7 and this is rendered easy by the use of the shims 21. If the device be made of rather thin brass, the same will give enough to allow considerable adjustment. Of course, the device could be used without shims, the taking up being accomplished by filing the brasses.

It will be obvious that many changes in the construction, combination and arrangement of parts could be made, which could be used without departing from the spirit of my invention, and I do not mean to limit the invention to such details, except as particularly pointed out in the claim.

Having thus described my invention, what I claim and desire to secure by Letters Patent of the United States is:—

A bearing for the drive shaft housing of an automobile comprising a bell-housing having a hollow neck extending therefrom, said neck having an outwardly extending flange at its free end, a drive shaft housing snugly and slidably telescoping within said neck, a split collar including an end portion enveloping said neck and an opposite end portion enveloping said shaft housing and slidably contacting with the shaft housing, and an intermediate portion of larger diameter than either of said end portions extending about said flange, said split collar having transverse side walls extending from opposite ends of the intermediate portion to the opposite end portions of the split collar, said walls extending upon opposite sides of said flange, and means for clamping the sections of the split collar together.

WILLIAM S. PIERCE.